(12) United States Patent
Corsi

(10) Patent No.: US 6,622,765 B1
(45) Date of Patent: Sep. 23, 2003

(54) REINFORCING TIRE BEAD FOR A RADIAL TIRE

(75) Inventor: Patrick Corsi, Thuret (FR)

(73) Assignee: Compagnie Generale des Etablissements Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/665,468

(22) Filed: Sep. 20, 2000

Related U.S. Application Data

(63) Continuation of application No. PCT/EP99/01470, filed on Mar. 8, 1999.

(30) Foreign Application Priority Data

Mar. 20, 1998 (FR) .............................. 98 03570

(51) Int. Cl.[7] .......................... B60C 13/00; B60C 15/00; B60C 15/06
(52) U.S. Cl. ....................... 152/539; 152/542; 152/546; 152/552; 152/555
(58) Field of Search ................................ 152/541–543, 152/552, 554, 555, 539, 553, 546

(56) References Cited

U.S. PATENT DOCUMENTS

| | | | | |
|---|---|---|---|---|
| 2,958,360 A | * | 11/1960 | Macklem | 152/542 |
| 3,638,705 A | * | 2/1972 | Devienne | 152/542 |
| 4,214,620 A | * | 7/1980 | Mezzanotte | 152/543 |
| 4,319,621 A | * | 3/1982 | Motomura | 152/542 |
| 4,699,194 A | | 10/1987 | Iuchi | |
| 5,080,158 A | * | 1/1992 | Kawamura | 152/541 |
| 5,529,104 A | * | 6/1996 | Delias | 152/546 |
| 5,935,354 A | * | 8/1999 | Billieres | 152/527 |

FOREIGN PATENT DOCUMENTS

| | | |
|---|---|---|
| DE | 3518940 | * 11/1986 |
| EP | 0202925 | 11/1986 |
| EP | 0251145 | 1/1988 |
| FR | 1234995 | * 5/1960 |
| FR | 1594780 | 6/1970 |
| FR | 2730190 | 8/1996 |
| GB | 2035228 | 6/1980 |
| JP | 62-4615 | * 1/1987 |
| JP | 62029403 | * 2/1987 |
| JP | 62-131804 | * 6/1987 |
| JP | 06-115327 | * 4/1994 |
| JP | 8-91026 | * 4/1996 |

OTHER PUBLICATIONS

Derwent Abstract for French Patent No. FR 2 730 190.
Derwent Abstract for French Patent No. FR 1 594 780.
Patent Abstracts of Japan vol. 011 No. 360 (M–645) Nov. 25, 1987 & JP 62 137207 A (Bridgestone Corp.) Jun. 20, 1987.

* cited by examiner

*Primary Examiner*—Jeff H. Aftergut
*Assistant Examiner*—Justin Fischer
(74) *Attorney, Agent, or Firm*—Baker Botts LLP

(57) ABSTRACT

A tire, designed to carry heavy loads, having a radial carcass reinforcement formed of at least one ply of inelastic reinforcing elements and anchored in each bead to a bead wire so as to form a turn-up whose end is a radial distance $H_{RNC}$ away from the base of the bead, each bead being reinforced by at least two additional reinforcement armatures, at least one first armature being formed of radial reinforcement elements and at least one second armature being formed of elements that make with the circumferential direction an angle $\alpha$ such that $0° \leq \alpha \leq 45°$, the first reinforcement armature being formed of radial elements and being wrapped around the bead wire outside the carcass reinforcement while the second armature is not wrapped around the said bead wire.

3 Claims, 2 Drawing Sheets

REINFORCING TIRE BEAD FOR A RADIAL TIRE

This is a continuation of PCT/EP99/01470, filed Mar. 8, 1999.

BACKGROUND OF INVENTION

The present invention concerns a tire with radial carcass reinforcement, more particularly a "Heavy Duty" tire designed for mounting on vehicles such as trucks, road tractors, buses, trailers and others, and in which a new reinforcement structure of the beads is adopted with a view to improving the endurance of the said beads.

In general a tire of the type considered comprises a carcass reinforcement formed of at least one ply of metallic cables anchored in each bead to at least one bead wire with a turn-up. Radially above the carcass reinforcement is a crown reinforcement consisting of at lest two plies of metallic cables crossed from one ply to the next and forming angles between 10° and 45° relative to the circumferential direction. The turn-ups of the carcass reinforcement are generally reinforced by at least one ply of metallic cables orientated at a slight angle relative to the circumferential direction.

If only one bead reinforcement ply is present, this can be located along the carcass reinforcement turn-up with a radially upper end over or under the radially upper end of the turn-up of the carcass reinforcement. As for the radially lower end of such a ply, this is generally located either on a line parallel to the rotation axis and passing approximately through the center of gravity of the median section of the anchoring bead wire of the carcass reinforcement, in the case of a tire having beads designed to be mounted on rim seats inclined at 15°±2°, or on a line parallel to the rotation axis passing through a point located between the center of gravity of the median section of the anchoring bead wire and the point where the axial width of the carcass reinforcement is widest, in the case of a tire having beads designed to be mounted on rim seats inclined at 0° or at 5°±1°. In this second case the bead reinforcement ply is then wrapped around the bead wire so that it has an axially outer part and an axially inner part, the radially upper end of the axially inner part generally being located below the radially upper end of the axially outer part.

The aim of the known solution is to avoid de-radialization of the carcass reinforcement turn-up cables and to minimize the radial and circumferential deformations undergone by the end of the said turn-up and by the layer of rubber outside which covers the bead and ensures its contact with the rim.

In other cases the metallic reinforcing ply has been replaced by several plies, for example made of textiles, located axially either on the same side as the turn-up or on either side thereof, or again partly along the turn-up and partly along the carcass reinforcement. Another variant consists in positioning two reinforcement plies along the turn-up on either side thereof, and a third ply along the carcass reinforcement axially on the outside.

The endurance of tire beads can also be improved by arranging along the carcass reinforcement two reinforcing plies, while the turn-up of the said reinforcement is not reinforced.

Due to the progress achieved and to the fact that certain types of rolling surfaces have been made less harsh where tire tread is concerned, the life of "Heavy Duty" tires has become such that it is again necessary to improve the bead endurance, more especially in tires subjected to prolonged rolling which often results in high bead temperatures by virtue of the temperatures reached by the rims to which they are fitted.

According to French patent application FR 2 730 190 the said improvement can be achieved by the presence in the beads of at least one reinforcement ply formed of circumferential metallic elements wrapped around the bead wire outside the rolled-up part of the carcass reinforcement, such that the ends, respectively, of the axially outer and axially inner parts are radially located above a line parallel to the rotation axis and passing through the point of the bead wire furthest from the said rotation axis. As is known, the carcass reinforcement, formed of radial wires or cables is therefore at the level of its contact surface with the bead wire formed of essentially circumferential elements which are generally metallic in the form of wires, cables, ribbons or rolled-up strips inserted between the said elements with essentially circumferential orientation and the additional ply of metallic elements, they too being circumferential. This structure therefore enables the tensile forces undergone by the carcass reinforcement to be absorbed and so minimizes all the deformations at the ends of the carcass reinforcement turn-up regardless of the rolling conditions.

The same application FR 2 730 190 describes an advantageous variant for reinforcing the bead, in which the end of the axially inner part of the ply of circumferential elements is covered by a reinforcing ply 9 consisting of radial metallic cables.

To obtain more effective stiffening of the beads and the low parts of the side-walls of a tire with radial carcass reinforcement, the patent FR 1 594 780 proposes that the bead reinforcement armatures, located axially outside the main part of the carcass reinforcement and axially inside the turn-up of the said reinforcement, should consist of radial reinforcement elements.

To improve the endurance of the beads of radial tires for heavy vehicles, application EP 0 202 925 also proposes the use of two additional bead reinforcement armatures, a first consisting of metallic elements and a second armature of elements inclined relative to the median direction, such that the radial positions of the radial ends of the said armatures are specified.

SUMMARY OF THE INVENTION

This invention proposes another solution, which is technically and industrially optimum for tires with beads designed to be mounted on rims of the type called flat or whose rim seats are inclined at 5°.

To improve the endurance of a tire designed to carry heavy loads, according to the invention the said tire comprises at lest one radial carcass reinforcement formed of at least one ply of inelastic reinforcing elements anchored in each bead to a bead wire to form a turn-up whose end is located at a radial distance $H_{RNC}$ from the base of the bead, and each bead is reinforced by at least two additional reinforcement armatures, at least one first armature formed of a single ply of radial inelastic metallic reinforcing elements wrapped around the anchoring bead wire of the carcass reinforcement outside the said carcass reinforcement and forming two parts such that the radially upper end of the axially outer part is located radially a distance $H_{LE}$ from the base of the bead equal to at least 65% of the distance $H_{RNC}$, and at least one second armature formed of elements which make an angle $\alpha$ with the circumferential direction such that $0° \leq \alpha \leq 45°$, characterized in that when viewed in median section, the second additional bead reinforcement armature, which is not wrapped around the said anchoring bead wire, is formed of at least one ply of circumferential metallic reinforcement elements, which are sections or bundles of sections of metallic cables whose circumferential length is smaller than the circumferential length of the median axis of the bead wire.

Reinforcement elements are considered radial if the angle they make with the tire's circumferential direction is within the range 80°–100°.

The term 'armature wrapped around the bead wire' means an armature forming two parts, an axially inner and an axially outer part, whose respective ends are radially above a line parallel to the rotation axis and passing through the center of gravity of the cross-section of the anchoring bead wire.

Similarly, in the context of the invention, the radially upper end of the part of a bead reinforcement armature which can consist of one or more plies is understood to mean the end of the armature ply furthest from the rotation axis, and the armature plies can have upper ends within a radial distance range of at most 20 mm. Likewise, the radially lower end of a bead reinforcement armature is the lower end of the ply least distant from the rotation axis.

The first armature of radial reinforcing elements preferably has the end of its axially inner part located between the line parallel to the rotation axis and passing through the center of gravity of the cross-section of the bead wire and the line parallel to the said rotation axis and passing through the point where the carcass reinforcement is axially widest. The radially upper end of the axially outer part is then preferably located a radial distance from the base of the bead between 65% and 95% of the distance $H_{RNC}$ separating the turn-up end of the carcass reinforcement from the said base.

According to a second aspect of the invention, the second armature is formed of two plies of reinforcing elements parallel to one another within each ply, crossed from one ply to the next, and making an angle of 45° with the circumferential direction, as measured at the radially lower edges of the said two plies. The reinforcing elements are advantageously wires or textile cables, and the said structure of the second armature is particularly advantageous in the case when the first bead reinforcement armature consists of textile reinforcing elements. The end of the axially outer part can be located a radial distance from the base of the bead greater than the distance $H_{RNC}$, while remaining smaller than the radial distance separating the said base from the end of the axially inner part.

Whether made of textile or metal, the second armature is advantageously arranged either axially inside or axially outside the part of the carcass reinforcement not turned up, with a radially upper end closer to the rotation axis than is the upper end of the axially inner part of the armature of radial elements.

When it is positioned axially inside the carcass reinforcement, the second armature is preferably between the said part of the carcass reinforcement not turned up and the first armature of radial reinforcement elements.

DESCRIPTION OF THE DRAWINGS

The characteristics of the invention will be better understood with the help of the description below, which refers to the drawings illustrating examples of embodiments in a non-limiting way, in which.

DESCRIPTION OF PREFERRED EMBODIMENTS

Figure 1:
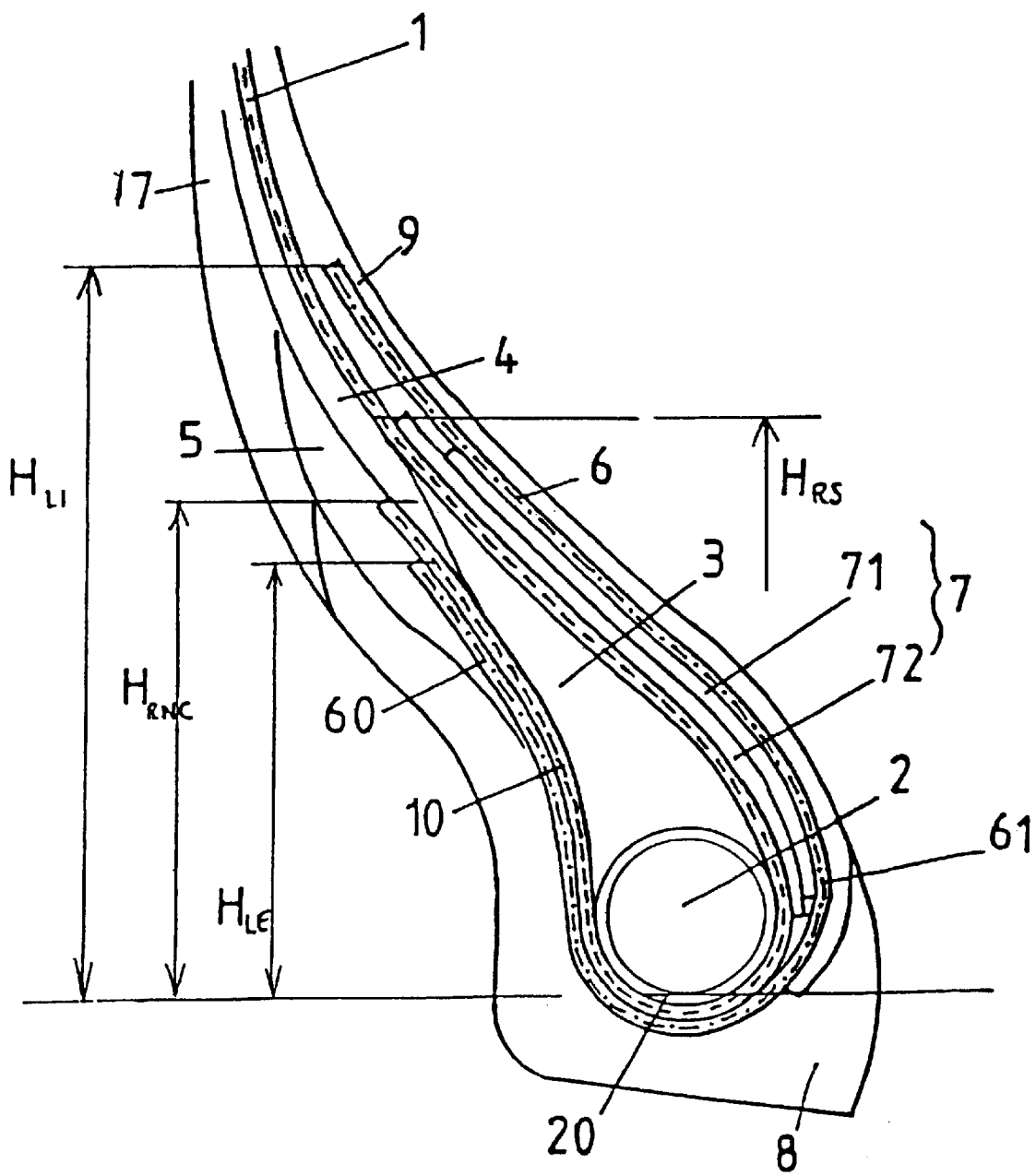
FIG. 1 is a schematic representation of a first variant of a tire bead according to the invention.

The tire bead shown in FIG. 1 is that of a 10.00–20× tire for mounting on a rim with rim seats inclined at 5°. The said bead is reinforced by a bead wire 2. Around the said bead wire 2 is anchored a carcass reinforcement 1 consisting of a single ply of metallic cables. Anchoring is effected by a turn-up 10 around the layer 20 of rubber mix covering the bead wire 2, with a distance $H_{RNC}$ separating the radially upper end of the said turn-up 10 from the base of the bead, the said base being conventionally represented by the line parallel to the rotation axis and passing through the point of the bead wire 2 closest to the said rotation axis. In the example of a size 10.00–20× tire considered, $H_{RNC}$ is equal to 0.25 times the height H of the tire on its rim, the said height being the radial distance separating the tire point radially furthest away from the rotation axis from the measurement line of the nominal diameter of the mounting rim, and equal to 270 mm. Between the carcass reinforcement 1 and its turn-up 10, and radially above the bead wire 2, is positioned a first bead wire packing 3 made of a rubber mix generally with high Shore hardness, the said first packing 3 being extended radially by a second packing 4 made of a rubber mix with lower hardness than the first, the radially upper end of the said packing 4 being essentially located at the level of the tire's maximum axial width.

Axially inside the non turned-up part of the carcass ply 1 and, after turning up around the bead wire 2, axially outside the turn-up 10 of the ply 1, is arranged a first bead reinforcement armature consisting in the example described of a single ply 6, such as to form two parts, an axially inner part 61 and an axially outer part 60. The radially upper ends of the two respective parts 61 and 60 are located relative to the base of the bead at heights $H_{LI}$ and $H_{LE}$, respectively, equal to 80 mm and 58 mm, the height $H_{LE}$ being 85% of the height $H_{RNC}$. The ply of the said first armature is formed of metallic wires of cables orientated at 90° relative to the circumferential direction. Axially on the outside, the two respective ends of the carcass reinforcement turn-up and the axially outer part of the reinforcement ply 6 are covered by a third packing 5, known as the filler, which is in contact on one side with the second bead wire packing 4 and with parts of the plies 60 and 10. Between the axially inside part 61 of the bead reinforcement ply 6 and the non turned-up part of the carcass ply 1 is arranged a second bead reinforcement armature 7, consisting in the example described of two plies 71 and 72 of textile cables made from aliphatic polyamide, parallel to one another within each ply and crossed from one ply 71 to the next 72, and forming with the circumferential direction an angle of 45°, measured in the vulcanized tire at the radially lower edges of the plies 71 and 72, to within manufacturing tolerances, i.e. an angles in the range 45°±1.5°. The radially upper end of the armature 7, which is conventionally taken as the radially upper end of the ply 72, the ply whose end is furthest from the rotation axis, is located a radial distance $H_{RS}$ from the base of the bead equal to 55 mm, i.e. smaller than the distance $H_{LI}$ of the radially upper end of the axially inner part of the bead reinforcement ply 6 by at least 33% of $H_{LI}$. The upper end of the second ply 71 of the armature 7 is radially below the end of the ply 72 by 6 mm. As for the radially lower ends of the two plies 71 and 72, these are essentially the same distance away from the rotation axis and distances away from the base of the bead respectively equal to 11 mm and 8 mm, i.e. very close to the bead base.

The ply 6 of the said first bead reinforcement armature may be formed of cables made of a textile material, for example aliphatic polyamide, and are orientated at 90° relative to the circumferential direction. The said ply 6 also has two parts, an axially inner part 61 and an axially outer part 60. The radially upper end of the part 60 is then located relative to the bead base at a height $H_{LE}$ equal to 75 mm.

As known in its own right, most of the bead is surrounded by a protective rubber mix 8 which, axially on the inside, is extended radially on the outside by the usual reinforcing and internal rubber layers 9, whereas axially on the outside it is radially extended on the outside by the side-wall layer 17.

Figure 2:
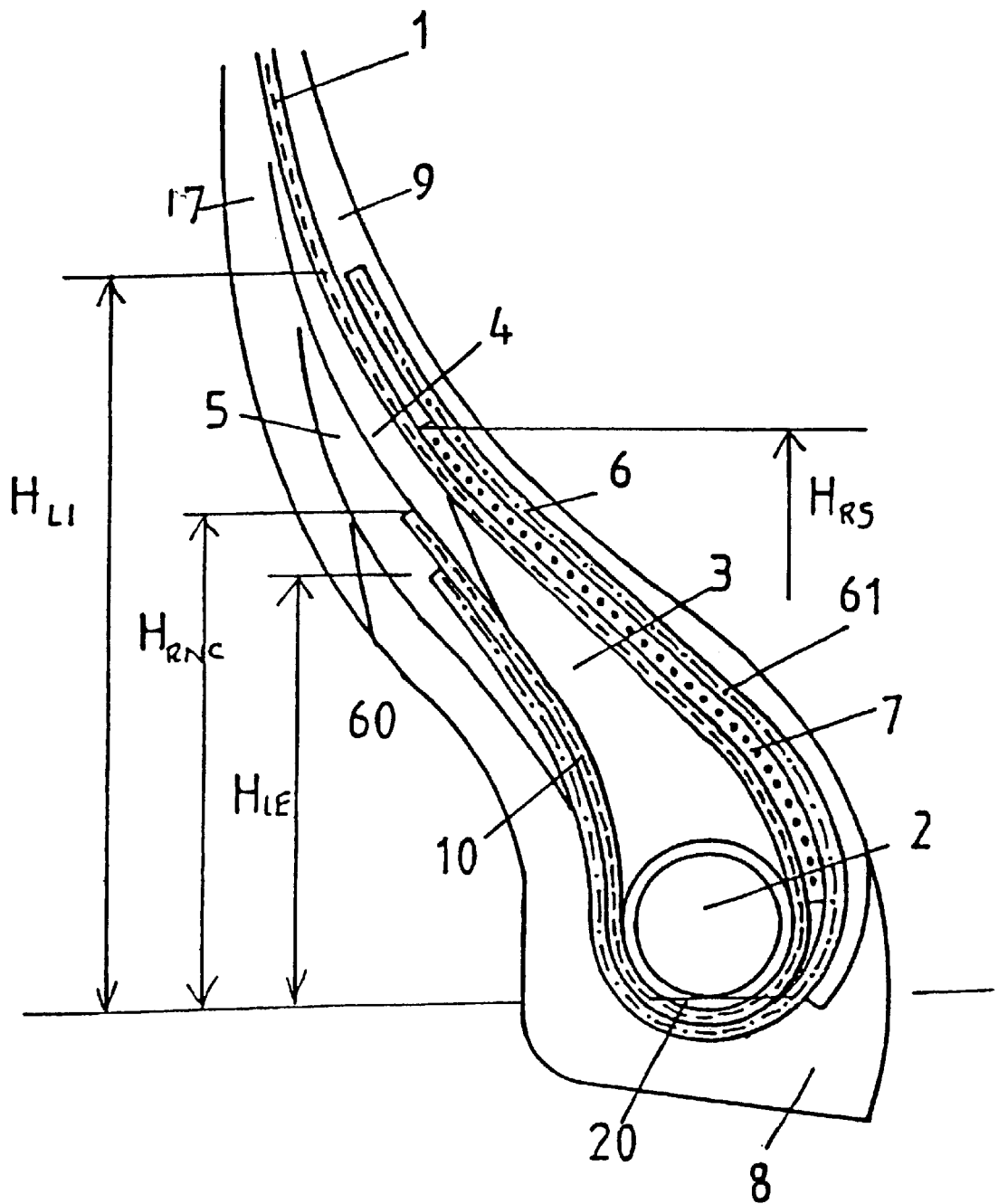
FIG. 2 is a schematic representation of a second variant of a bead according to the invention, the bead wires being braided and the bead being thinner.

The structure of the bead shown in FIG. 2 differs from that described above in that the second bead reinforcement armature consists of one ply 7 of metallic elements instead of the two textile plies in the preceding example. The said elements are parallel to one another within the ply 7 and may be circumferential, i.e. forming an angle with the circumferential direction of α equal to 0° to within manufacturing tolerances, i.e. within the range −1.5°; +1.5°. The elements may be inelastic metal cables but the fabrication of the tire is advantageously facilitated by the use of elastic cables as reinforcing elements, and even more so by the use of sections, or bundles or groups of cables whose circumferential length is between 0.2 and 0.4 times the circumferential length of the reinforcement armature, since this enables the bead reinforcement armature to be positioned on the drum on which the uncured carcass reinforcement blank is made up and the toroidal shaping of the said tire blank without great difficulties, the said mean length being measured after positioning on the said make-up drum. The circumferential gaps or cuts between cut elements are preferably staggered relative to one another. The elements of the ply of the second reinforcement armature 7 can also form a small angle relative to the circumferential direction, which may for example be 22°; in this case the reinforcing elements are inelastic cables.

The combined presence of a reinforcement armature of radial elements wrapped around the carcass reinforcement anchoring bead wire and a reinforcement armature which minimizes the de-radialization of the radial elements of the carcass reinforcement, leads not only to a considerable reduction of the stresses affecting the rubber mixes that constitute the bead, more particularly at the ends of the plies, but also to an improvement of the fatigue resistance of the carcass reinforcement cables.

I claim:

1. A heavy duty tire, comprising at least one radial carcass reinforcement formed of at least one ply of inelastic reinforcement elements and anchored in each tire bead to a bead wire, with a turn-up whose end is located a radial distance $H_{RNC}$ from the base of the bead, each bead being reinforced by at least two additional reinforcement armatures, at least one first armature formed of a single ply of radial metallic inelastic reinforcement elements wrapped around the anchoring bead wire of the carcass reinforcement and forming axially inner and outer parts such that the radially upper end of the axially outer part is located radially a distance $H_{LE}$ from the base of the bead equal to at least 65% and at most 95% of the distance $H_{RNC}$, and at least one second armature, wherein, when viewed in median section, the second additional bead reinforcement armature, which is not wrapped around the anchoring bead wire, is formed of at least one ply of circumferential metallic reinforcing elements which are sections or bundles of sections of metallic cables whose circumferential length is smaller than the circumferential length of the median axis of the bead wire.

2. A tire according to claim 1, wherein the second armature is arranged axially adjacent to the part of the carcass reinforcement not turned up, having a radially upper end closer to the rotation axis than is the radially upper end of the axially inner part of the first armature of radial elements and a radially lower end located radially below the top of the bead wire.

3. A heavy-duty tire, comprising at least one radial carcass reinforcement formed of at least one ply of inelastic reinforcement elements and anchored in each tire bead to a bead wire, with a turn-up whose end is located a radial distance $H_{RNC}$ from the base of the bead, each bead being reinforced by at least two additional reinforcement armatures, at least one first armature formed of a single ply of radial metallic inelastic reinforcement elements wrapped around the anchoring bead wire of the carcass reinforcement and forming axially inner and outer parts such that the radially upper end of the axially outer part is located radially a distance $H_{LE}$ from the base of the bead equal to at least 65% and at most 95% of the distance $H_{RNC}$, and at least one second armature, wherein, when viewed in median section, the second additional bead reinforcement armature, which is not wrapped around the anchoring bead wire, is formed of at least one ply of circumferential metallic reinforcing elements which are sections or bundles of sections of metallic cables whose circumferential length is smaller than the circumferential length of the median axis of the bead wire, the second armature being arranged axially inside the part of the carcass reinforcement not turned up, between the unturned part of the carcass reinforcement and the first reinforcement armature of radial elements, having a radially upper end closer to the rotation axis than is the upper end of the axially inner part of the armature of radial elements and a radially lower end located radially below the top of the bead wire.

* * * * *

UNITED STATES PATENT AND TRADEMARK OFFICE
CERTIFICATE OF CORRECTION

PATENT NO. : 6,622,765 B1
DATED : September 23, 2003
INVENTOR(S) : Corsi, Patrick It is certified that error appears in the above-identified patent and that said Letters Patent is hereby corrected as shown below:

Title page,
Item [73], "Generale" should read -- Générale --

Column 2,
Line 52, "lest" should read -- least --

Column 4,
Lines 30 and 48, "non turned-up" should read -- non-turned-up --
Line 56, "angles" should read -- angle --

Signed and Sealed this

Sixth Day of January, 2004

JAMES E. ROGAN
*Director of the United States Patent and Trademark Office*